United States Patent
Choi et al.

(10) Patent No.: US 12,248,677 B2
(45) Date of Patent: Mar. 11, 2025

(54) DATA PROCESSING SYSTEM AND OPERATING METHOD THEREOF

(71) Applicant: SK hynix Inc., Gyeonggi-do (KR)

(72) Inventors: Jung Min Choi, Gyeonggi-do (KR); Sun Woong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 302 days.

(21) Appl. No.: 17/845,501

(22) Filed: Jun. 21, 2022

(65) Prior Publication Data

US 2023/0205418 A1   Jun. 29, 2023

(30) Foreign Application Priority Data

Dec. 28, 2021   (KR) .......................... 10-2021-0189522

(51) Int. Cl.
*G06F 3/00*   (2006.01)
*G06F 3/06*   (2006.01)

(52) U.S. Cl.
CPC .......... *G06F 3/0604* (2013.01); *G06F 3/0631* (2013.01); *G06F 3/067* (2013.01)

(58) Field of Classification Search
CPC ....... G06F 3/0604; G06F 3/0631; G06F 3/067
See application file for complete search history.

(56) References Cited

U.S. PATENT DOCUMENTS 10,552,058 B1 *   2/2020   Jadon .................... G06F 3/0647
2013/0326064 A1 *  12/2013   Gulati .................. H04L 47/805
                                                         709/226

FOREIGN PATENT DOCUMENTS

KR   10-2019-0115402 A   10/2019
KR   10-2021-0113859 A    9/2021

* cited by examiner

*Primary Examiner* — Craig S Goldschmidt
(74) *Attorney, Agent, or Firm* — IP & T GROUP LLP

(57) ABSTRACT

A data processing system includes data processing devices each including a computing memory and configured to perform a task; one or more host devices connected to the data processing devices, and each configured to: select one or more of the data processing devices based on meta information including a size of a memory, and sizes of the computing memories of the respective data processing devices, and request the selected processing devices to perform a first task; a network switch configured to connect the one or more host devices to the data processing devices; and a network manager in the network switch and configured to: collect free memories of the respective data processing devices based on the meta information and the sizes of the computing memories of the respective data processing devices, and control the one or more host devices to use some of the free memories.

12 Claims, 8 Drawing Sheets

DATA PROCESSING SYSTEM AND OPERATING METHOD THEREOF

CROSS-REFERENCES TO RELATED APPLICATION

The present application claims priority under 35 U.S.C, § 119(a) to Korean patent application number 10-2021-0189522, filed on Dec. 28, 2021, which is incorporated herein by reference in its entirety.

BACKGROUND

1. Technical Field

Various embodiments of the present disclosure generally relate to a semiconductor integrated apparatus, and more particularly, to a data processing system and an operating method thereof.

2. Related Art

The growth of importance and requests for artificial intelligence (AI) applications, big data analysis, and graphics data processing has increased the demand for a computing system capable of efficiently processing big data by using more computing resources, a high-bandwidth network, and a high-capacity and high-performance memory device.

However, there is a limitation in expanding the memory capacity of a processor to process big data. Thus, a protocol has been recently developed, which expands a memory capacity through a fabric network. Fabric attached memory (FAM) theoretically has no limitation in expanding a capacity, and thus has a structure suitable for processing big data. However, as the number of times that a host device accesses the FAM increases, various problems such as performance reduction and power consumption may be caused by data migration.

From this point of view, the recent computing systems have evolved to data-driven computing or memory-driven computing systems which can process an enormous volume of data in parallel at high speed. In the data (memory)-driven computing system, a processor for performing computation may be disposed close to a memory device or within the memory device, and process a task (operation processing or application processing task) offloaded and requested by the host device.

A data processing system in which near data processing (NDP) is applied to a FAM capable of providing plenty of memory resources requires a method for efficiently using memory resources, the NDP indicating a process of performing a task offloaded by a host device.

SUMMARY

In an embodiment of the present disclosure, a data processing system may include: a plurality of data processing devices each including a computing memory and configured to perform a task offloaded from one or more host devices; the one or more host devices connected to the plurality of data processing devices, and each configured to: select one or more of the data processing devices on the basis of meta information including a size of a memory, which is required for a first task to be performed by the selected data processing devices and sizes of the computing memories of the respective data processing devices, and request the selected one or more data processing devices to perform the first task; a network switch configured to connect the one or more host devices to the plurality of data processing devices; and a network manager included in the network switch and configured to: collect free memories of the respective data processing devices on the basis of the meta information and the sizes of the computing memories of the respective data processing devices, and control the one or more host devices to use at least some of the free memories.

In an embodiment of the present disclosure, there is provided an operating method of a data processing system in which a plurality of data processing devices each having a computing memory are connected to one or more host devices through a network manager, the operating method comprising: selecting, by each of the one or more host devices, one or more of the plurality of data processing devices on the basis of meta information including a size of a memory, which is required for a first task to be performed by the selected data processing devices and sizes of the computing memories of the respective data processing devices, requesting, by each of the one or more host devices, the selected one or more data processing devices to perform the first task; collecting, by the network manager, free memories of the respective data processing devices on the basis of the meta information and the sizes of the computing memories of the respective data processing devices; and controlling, by the network manager, the one or more host devices to use at least some of the free memories.

In an embodiment of the present disclosure, there is provided an operating method of a network device for interconnecting one or more first devices and one or more second devices with one another, the operating method comprising: identifying available capacities of memories respectively included in the first and second devices; and transferring a control signal and a data signal to the first and second devices for one or more of the first devices to share, for their operations, at least a part of the available capacities.

DETAILED DESCRIPTION

Hereafter, embodiments of the present disclosure will be described in more detail with reference to the accompanying drawings.

Figure 1:
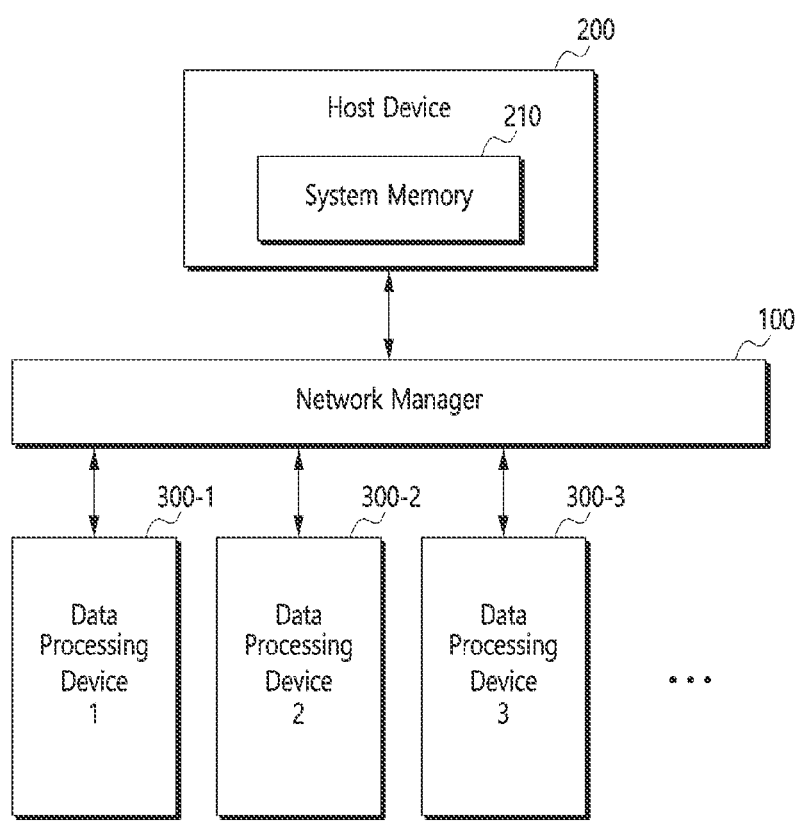
FIG. 1 is a configuration diagram illustrating a data processing system in accordance with an embodiment of the present disclosure.

FIG. 1 is a configuration diagram illustrating a data processing system in accordance with an embodiment of the present disclosure.

A data processing system 10 in accordance with an embodiment may include a plurality of data processing devices 3004, 300-2, 300-3, . . . coupled to a host device 200 through a network manager 100.

The network manager 100 may be included in a network switch which couples the host device 200 to the data processing devices 300-1, 300-2, 300-3, . . . through a fabric network such as Ethernet, Fiber channel or InfiniBand.

The network manager 100 may control memories included in the host device 200 and the data processing devices 300-1, 300-2, 300-3, . . . , respectively, such that the memories are shared in the data processing system 10, on the basis of the usage states of the memories.

Applications such as big data analysis and machine learning demand a computation targeted for an enormous volume of data. According to such a demand, the host device 200 may delegate a task (i.e., computation processing or application processing) of the host device 200 to near data processing (NDP) devices such as the data processing devices 300-1, 300-2, 300-3, . . . , such that the task is processed by the NDP devices.

Before offloading a task, the host device 200 may check meta information including the type of the task to be offloaded, the amount of computation, and the size (foot print) of a memory required for performing the task.

Offloading indicates delegating a task or computation, which is to be performed by a specific device, to another device. In an embodiment, the host device 200 may offload a task or computation, which is to be performed by the host device 200, onto the data processing devices 300-1, 300-2, 300-3, . . . .

The network manager 100 may transmit the states of computing resources, owned by the data processing devices 300-1, 300-2, 300-3, . . . , to the host device 200. The states of the computing resources, owned by the data processing devices 300-1, 300-2, 300-3, . . . , may be collected according to a request of the network manager 100, or may be collected by the spontaneous reports of the data processing devices 300-1, 300-2, 300-3, . . . on the states of the computing resources to the network manager 100. The computing resources may indicate hardware and software resources required for operations of the data processing devices 300-1, 300-2, 300-3, . . . , and include the quantities or sizes of memory resources. The memory resources included in the data processing devices 300-1, 300-2, 300-3, . . . may be referred to as computing memory resources.

The host device 200 may select a proper data processing device on the basis of the states of the computing resources owned by the data processing devices 300-1, 300-2, 300-3, . . . and the meta information of a task to be offloaded, and offload the task (i.e., computation processing or application processing) through the network manager 100.

As the task is offloaded, the network manager 100 may collect the usage state of the memory resource for each of the data processing devices 300-1, 300-2, 300-3, . . . , for example, information (e.g., addresses, capacities or the like) of a free memory resource, according to the computing resource of the data processing device to process the offloaded task and the foot print of the offloaded task, and allocate at least a part of the free memory resource to the host device 200.

The host device 200 may include a system memory 210. The system memory 210 is a working memory or main memory which stores an argument and process state required for operating a program, and data generated and updated during the process. The host device 200 may check the usage state of the system memory 210, e.g., the size of a memory occupied by a task in process and the size of a free memory, and spontaneously notify the check result to the network manager 100. In another embodiment, the network manager 100 may request and collect the information on the usage state of the system memory 210 from the host device 200.

The host device 200 may request a memory resource from the network manager 100 according to the usage state of the system memory 210. Based on the usage states of the memory resources included in the data processing devices 300-1, 300-2, 300-3, the network manager 100 may allocate at least some of the free memory resources to the host device 200.

The free memory resources of the data processing devices 300-1, 300-2, 300-3, . . . , which are additionally allocated to the host device 200, may be used as an external system memory of the host device 200.

The data processing devices 300-1, 300-2, 300-3, . . . may each perform an operation corresponding to a request of the host device 200 in response to the request, an address, and data of the host device 200, and transmit data, derived as the processing result, to the host device 200.

Figure 2:
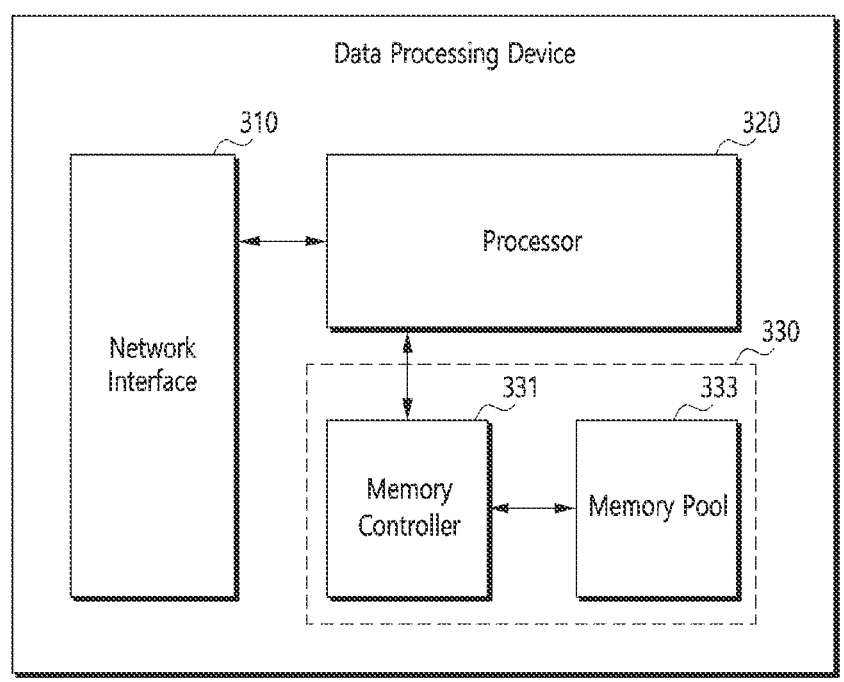
FIG. 2 is a configuration diagram illustrating a data processing device in accordance with an embodiment of the present disclosure.

FIG. 2 as a configuration diagram illustrating a data processing device in accordance with an embodiment of the present disclosure.

A data processing device 300 of FIG. 2 may be one of the data processing devices 300-1, 300-2, 300-3, . . . illustrated in FIG. 1.

Referring to FIG. 2, the data processing device 300 may include a network interface 310, a processor 320, and a memory device 330.

The network interface 310 may provide a communication channel through which the data processing device 300 can access the network manager 100 and communicate with the host device 200.

The processor 320 may include a plurality of cores. The processor 320 may be configured as a combination of a hardware device and software executed on the hardware device, and may process data by decoding a command transmitted to the data processing device 300 from the host device 200. The operation of processing data may include an operation of storing data, transmitted from the host device 200, in the memory device 330, an operation of reading data stored in the memory device 330, an operation of computing data on the basis of the read data, and an operation of providing the computed data to the host device 200 or the memory device 330.

The memory device 330 may include a memory controller 331 and a memory pool 333.

The memory controller 331 may be coupled to the memory pool 333 through a bus (not illustrated), for example, and control data input/output on the memory pool 333.

The memory pool 333 may include one or more memory modules. The memory pool 333 may be configured in the form of a High Bandwidth Memory (HBM) or Hybrid Memory Cube (HMC) in which a plurality of memory modules are stacked by a bus such as TSV, but may not be limited thereto.

In the FAM environment where one or more host devices 200 and one or more data processing devices 300 are connected through the network manager 100, the host device 200 may request the network manager 100 to offload a task, on the basis of the state of the computing resource of each data processing device 300 and the meta information of a task to be offloaded.

The network manager 100 may collect the usage states of the memory pools 333 included in the respective data processing devices 300 according to the usage state and foot print of the system memory 210 included in the host device 200. Furthermore, the network manager 100 may allocate at least a part of a free memory resource of the data processing device 300 as an external system memory of the host device 200 according to a request of the host device 200.

Figure 3:
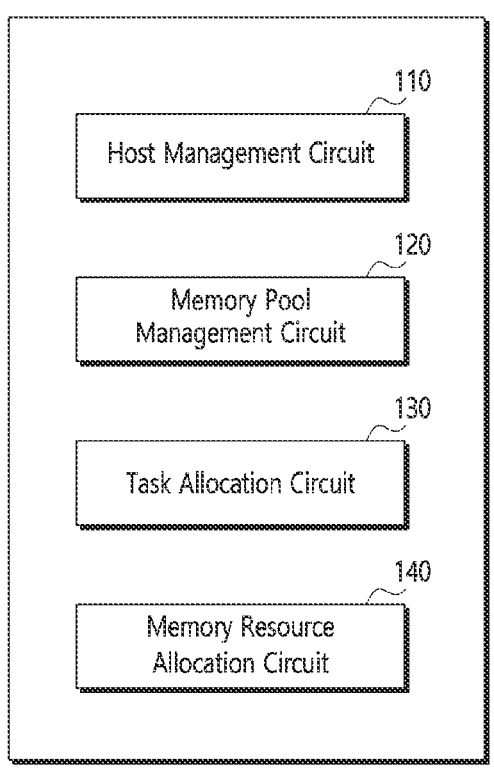
FIG. 3 is a configuration diagram illustrating a network manager in accordance with an embodiment of the present disclosure.

FIG. 3 is a configuration diagram illustrating a network manager in accordance with an embodiment of the present disclosure.

Referring to FIG. 3, the network manager 100 may include a host management circuit 110, a memory pool management circuit 120, a task allocation circuit 130, and a memory resource allocation circuit 140.

The host management circuit 110 may collect the usage state of the system memory 210 through communication with the host device 200. The usage state of the system memory 210 may be provided from the host device 200 according to a request of the network manager 100, or the host device 200 may spontaneously transmit the usage state of the system memory 210.

As the host device 200 requests the network manager 100 to offload a task, the memory pool management circuit 120 may collect the usage state of the memory pool 333 included in the data processing device 300 to process the task. That is, according to the size (foot print) of a memory required for performing the task which the network manager 100 has been requested to offload and the size of the memory resource included in the data processing device 300 to process the task, the memory pool management circuit 120 may collect the information (e.g., address, capacity and the like) of a free memory resource.

As the host device 200 intends to select a specific data processing device 300 and to offload a task, the task allocation circuit 130 may transmit, to the corresponding data processing device 300, an offload request and an address, data and the like which are related to the offload request.

When the host device 200 requests memory resource allocation, the memory resource allocation circuit 140 may allocate at least a part of the free memory included in the data processing device 300 as the external system memory of the host device 200, on the basis of the usage state of the memory pool of the data processing device 300.

Figure 4:
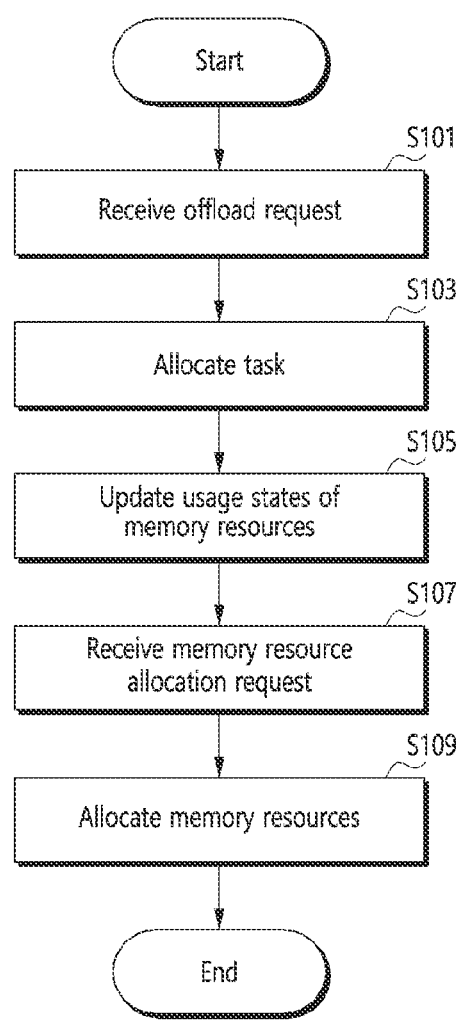
FIG. 4 is a flowchart for describing an operating method of a data processing system in accordance with an embodiment of the present disclosure.

FIG. 4 is a flowchart for describing an operating method of a data processing system in accordance with an embodiment of the present disclosure.

The host device 200 may check meta information before offloading a task, the meta information including the type of the task to be offloaded, the amount of computation, and the size (foot print) of a memory required for performing the task. Furthermore, the host device 200 may collect the states of computing resources owned by the data processing devices 300.

As the host device 200 selects a proper data processing device 300 on the basis of the states of the computing resources owned by the data processing devices 300 and the meta information of the task to be offloaded, and transmits an offload request to the network manager 100 in operation S101, the network manager 100 may transmit, to the corresponding data processing device 300 the offload request and an address, data and the like which are related to the offload request, in operation S103.

The memory resource usage state of the data processing device 300 onto which the task is offloaded may be changed on the basis of the foot print of the offloaded task, and the network manager 100 may collect the usage state of the memory pool, e.g., the information of a free memory resource, according to the foot print of the offloaded task and the size of the memory resource owned by the data processing device 300, in operation S105.

When an additional system memory is required according to the usage state of the system memory 210, the host device 200 may request the network manager 100 to allocate a memory resource in operation S107.

The network manager 100 may allocate at least a part of the free memory resource as an external system memory of the host device 200 on the basis of the usage state of the memory pool, in operation S109.

As the free memory resource is allocated as the external system memory, the allocation may be reflected to update page tables of the host device 200 and the data processing device 300.

Figure 5:
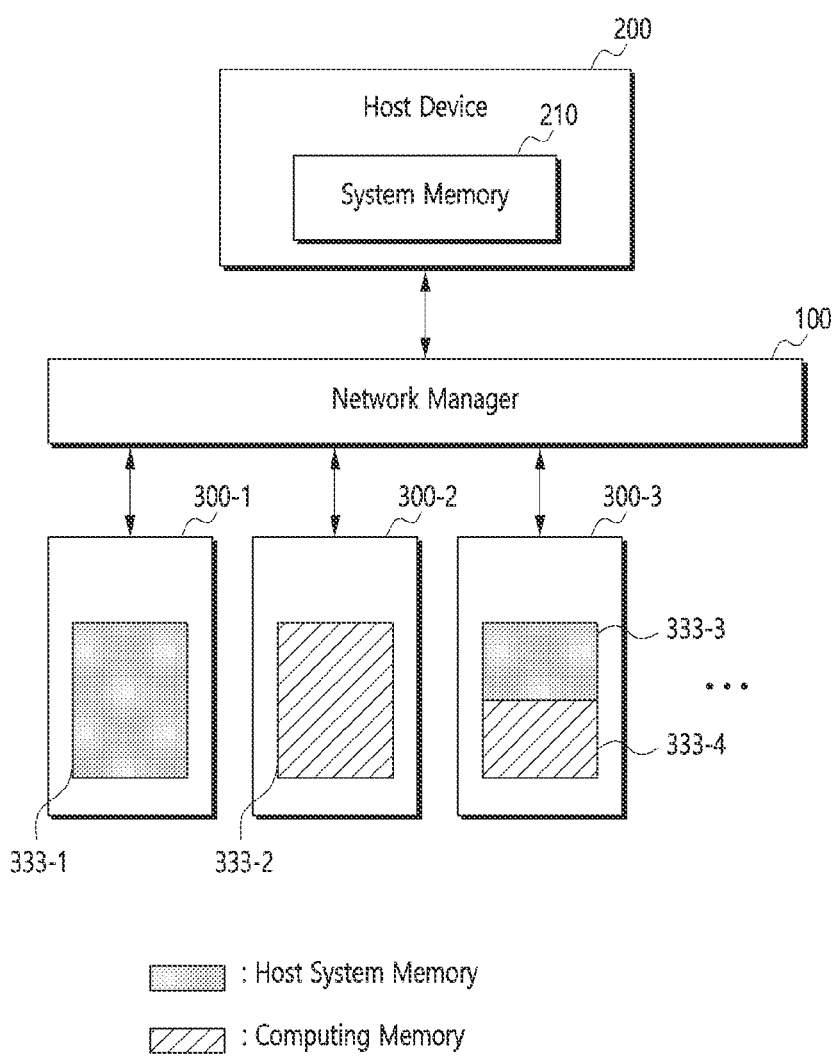
FIG. 5 is a conceptual view for describing a memory resource utilization method in accordance with an embodiment of the present disclosure.

FIG. 5 is a conceptual view for describing a memory resource utilization method in accordance with an embodiment of the present disclosure.

In order to allow memory resources to be shared within a data processing system 10-1, the network manager 100 may check the usage states of the memory pools through operation S105 of FIG. 4.

The check result for the usage states of the memory pools may show that the entire memory pool 333-2 of a second data storage device 300-2 and a partial memory pool 333-4 of a third data storage device 300-3 are used as a computing memory to perform a task offloaded by the host device 200, and the entire memory pool 333-1 of a first data storage device 300-1 and a partial memory pool 333-3 of the third data storage device 300-3 are a free memory.

Through S109 of FIG. 4, the network manager 100 may allocate the entire memory pool 333-1 of the first data processing device 300-1 as a first external system memory of the host device 200, and allocate the partial memory pool 333-3 of the third data processing device 300-3 as a second external system memory of the host device 200.

As the capacity of the working memory required for computation of the host device 200 is increased, the performance of the data processing system 10 may be improved.

Figure 6:
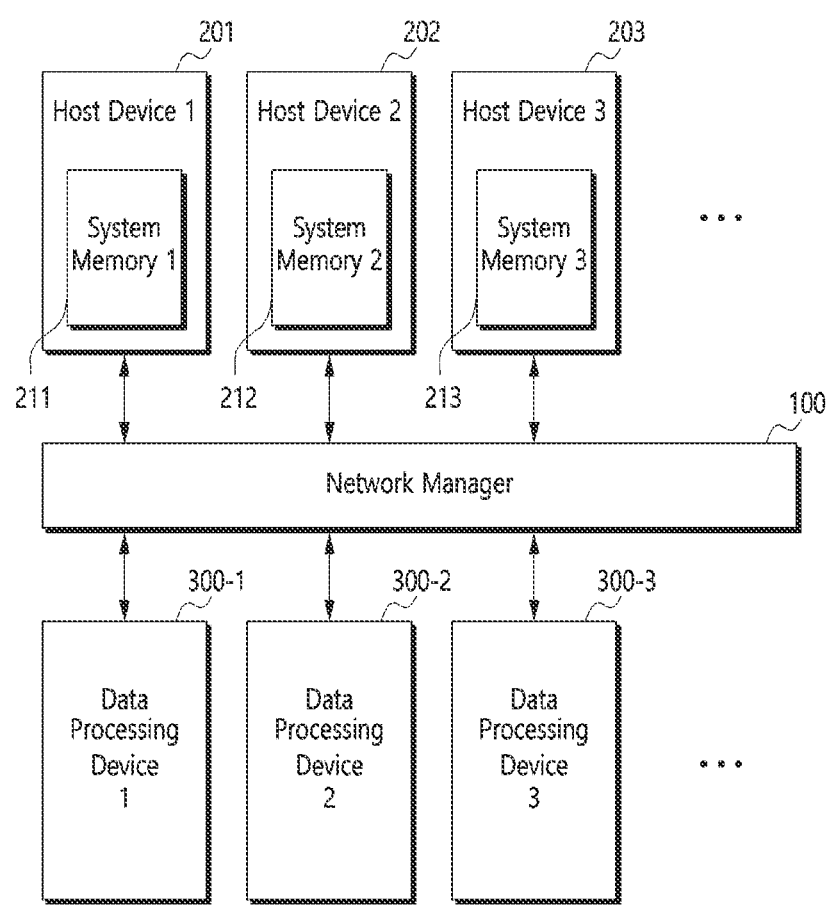
FIG. 6 is a configuration diagram illustrating a data processing system in accordance with an embodiment of the present disclosure.

FIG. 6 is a configuration diagram illustrating a data processing system 20 in accordance with an embodiment of the present disclosure.

Referring to FIG. 6, the data processing system 20 may include a plurality of data processing devices 300-1, 300-2, 300-3 connected to a plurality of host devices 201, 202, 203, through a network manager 100.

The network manager 100 may connect the host devices 201, 202, 203, . . . to the data processing devices 300-1, 300-2, 300-3, through a fabric network such as Ethernet, Fiber channel or InfiniBand.

Figure 8:
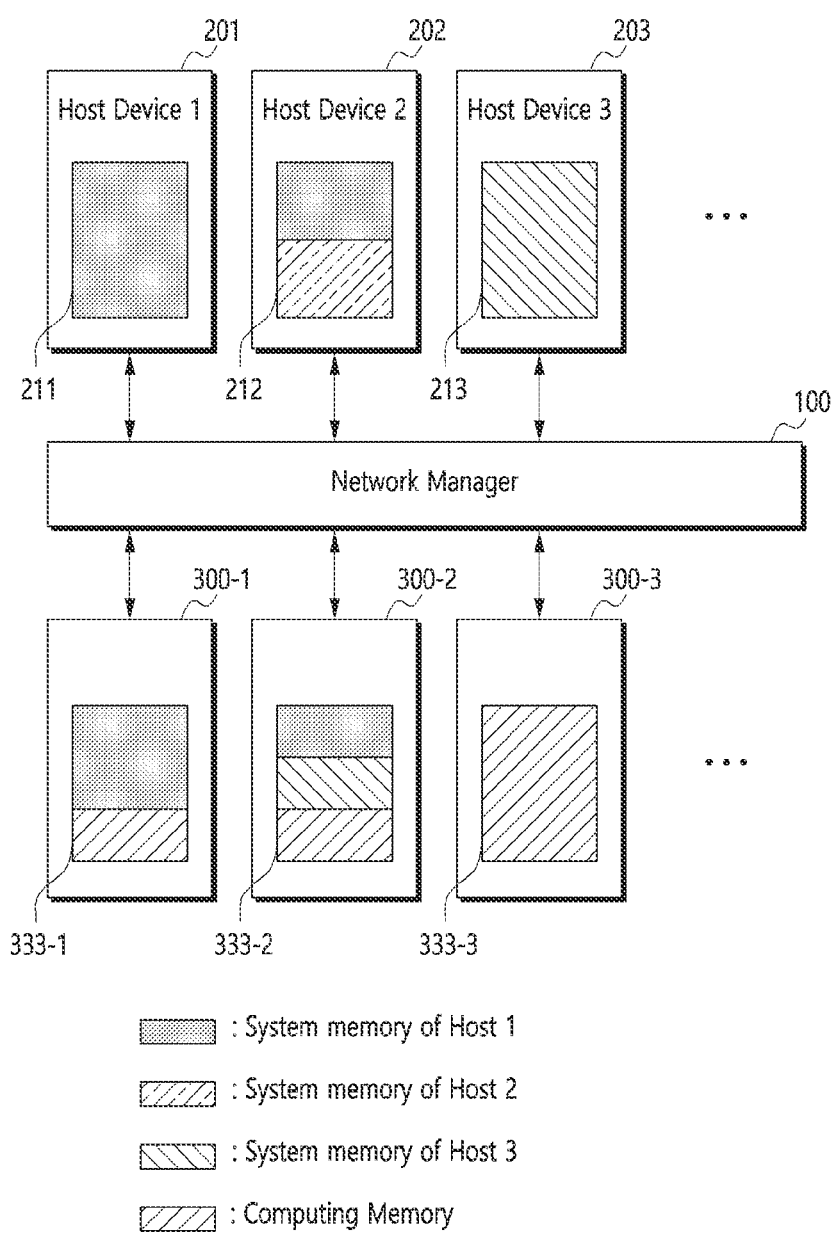
FIG. 8 is a conceptual view for describing a memory resource utilization method in accordance with an embodiment of the present disclosure.

The network manager 100 may control memory resources to be shared in the data processing system 20, on the basis of the usage states of memory resources included in the host devices 201, 202, 203, . . . and the data processing devices 300-1, 300-2, 300-3, . . . , i.e., system memories 211, 212, and 213 and memory pools (333-1, 333-2, and 333-3 of FIG. 8).

As one or more data processing devices 300-1, 300-2, 300-3, . . . process tasks offloaded by the host devices 201, 202, 203, . . . the network manager 100 may collect the usage states of the memory pools into which the memory foot prints of the data processing devices 300-1, 300-2, 300-3, . . . are reflected.

The host devices 201, 202, 203, . . . may include the system memories 211, 212, 213, . . . , respectively. The host devices 201, 202, 203, . . . may check the usage states of the system memories 211, 212, 213, . . . . The host devices 201, 202, 203, . . . may spontaneously report the usage states of the system memories 212, 212, 213, . . . to the network manager 100, or the network manager 100 may access the host devices 201, 202, 203, . . . and collect the usage states of the system memories 212, 212, 213, . . . .

The host devices 200-1, 200-2, 200-3, . . . may request a memory resource from the network manager 100 according to the usage states of the system memories 211, 212, 213, . . . . The network manager 100 may collect information (addresses, capacities and the like) of free memory resources on the basis of the usage states of the memory resources included in the data processing devices 300-1, 300-2, 300-3, . . . , and allocate at least some of the free memory resources to the host devices 201, 202, 203, . . . .

The free memory resources of the data processing devices 300-1, 300-2, 300-3, . . . , which are additionally allocated to the host devices 201, 202, 203, . . . , may be used as external system memories of the host devices 201, 202, 203, . . . .

When the size of the memory resources collected by the data storage devices 300-1, 300-2, 300-3, . . . , i.e. the size of the free memory resources, is larger than a threshold value, the network manager 100 may allocate the free memory resources, owned by the data storage devices 300-1, 300-2, 300-3, . . . , to the host devices 201, 202, 203, . . . .

For example, the network manager 100 may check whether a total of memory resources requested for allocation by the plurality of host devices 201, 202, 203, . . . is larger than the total of the free memory resources.

When the total of the memory resources requested for allocation is larger than the total of the free memory resources, the network manager 100 may distribute and allocate the free memory resources to the plurality of host devices 201, 202, 203, . . . , according to a preset standard.

In an embodiment, the standard for distributing the free memory resources may be selected among various standards, for example, a method for distributing free memory resources according to the ratios of memory resources requested for allocation respectively by the host devices 201, 202, 203, . . . , and a method for distributing memory resources in proportion to speeds required for services processed by the host devices 201, 202, 203, . . . . That is, since a variety of processing speeds are demanded according to the types of services which an external device has requested the host devices 201, 202, 203, . . . to process, and the host devices 201, 202, 203, . . . operate with the processing speeds set to target speeds thereof, external system memories may be provided to accomplish the target speeds.

When the total of the memory resources requested for allocation by the plurality of host devices 201, 202, 203, . . . is smaller than the size of a free memory resource included in one data processing device, the network manager 100 may divide the free memory resource included in the one data processing device, and allocate the divided free memory resources to the plurality of host devices 201, 202, 203, . . . .

When any of the host devices 201, 202, 203, . . . requests a memory resource, the network manager 100 may select a free memory resource from one or more data processing devices 300-1, 300-2, 300-3, . . . , and allocate the selected free memory resource.

When the size of the memory resources collected from the data storage devices 300-1, 300-2, 300-3, . . . , i.e. the free memory resources, is smaller than a preset threshold value, the network manager 100 may check whether a free memory resource is present in one or more of the system memories 211, 212, 213, . . . , and allocate the free memory resources of the system memories 211, 212, 213, . . . such that the free memory resources are shared by the host devices 201, 202, 203, . . . .

As such, the external system memories required by one or more host devices 201, 202, 203, . . . may be allocated from the free memory resources of the data processing devices 300-1, 300-2, 300-3, . . . , or allocated from free system memories of the other host devices, which makes it possible to improve the data processing performances of the host devices 201, 202, 203, . . . .

Figure 7:
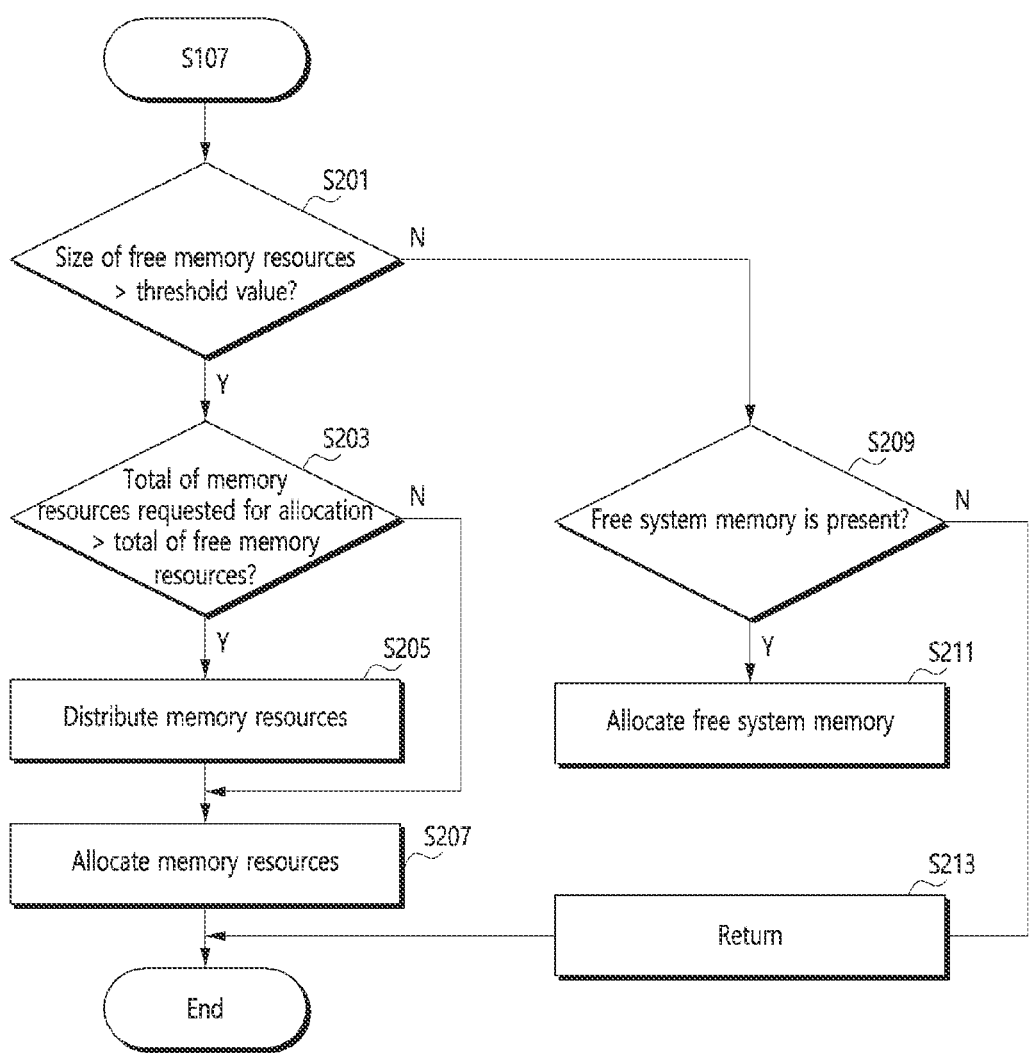
FIG. 7 is a flowchart for describing an operating method of a data processing system in accordance with an embodiment of the present disclosure.

FIG. 7 is a flowchart for describing an operating method of a data processing system in accordance with an embodiment of the present disclosure, FIG. 7 illustrates an operating method of the data processing system 20 when the plurality of host devices 201, 202, 203, . . . request memory resource allocation.

As the host devices 201, 202, 203, . . . request the network manager 100 to allocate memory resources in operation S107 (see FIG. 4), the network manager 100 may check whether the size of free memory resources is larger than the threshold value, on the basis of the usage states of the memory pools included in the data processing devices 300-1, 300-2, 300-3, . . . , in operation S201.

When the size of the free memory resources is larger than the threshold value (Y in operation S201), the network manager 100 may determine whether the total of the memory resources requested for allocation is larger than the total of the free memory resources included in the plurality of data processing devices 300-1, 300-2, 300-3, . . . , in operation S203.

When the total of the memory resources requested for allocation is larger than the total of the free memory resources (Y in operation S203), the network manager 100 may distribute the free memory resources in operation S205, and allocate the free memory resources to the plurality of host devices 201, 202, 203, . . . , in operation S207.

In order to distribute the memory resources, the network manager 100 may distribute the free memory resources according to the ratios of the memory resources requested for allocation by the respective host devices 201, 202, 203, . . . . In another embodiment, the network manager 100 may decide the sizes of the allocated memory resources in proportion to speeds required for processing services, on the basis of the types of the services processed by the respective host devices 201, 202, 203, . . . .

When the total of the memory resources requested for allocation is equal to or less than the total of the free memory resources (N in operation S203), the network manager 100 may allocate the free memory resources to the plurality of host devices 201, 202, 203, . . . in operation S207.

When the size of the free memory resources is equal to or less than the threshold value (N in operation S201), the network manager 100 may check whether a free system memory is present in one or more of the system memories 211, 212, 213, . . . , in operation S209.

When the free system memory is present (Y in operation S209), the network manager 100 may allocate free system memory resources of the system memories 211, 212, 213, . . . in operation S211.

As the external system memory is allocated, the allocation may be reflected to update the page tables of the host devices 201, 202, 203, . . . and the data processing devices 300-1, 300-2, 300-3, . . . .

When no free memory resource is present (N in operation S209), the network manager 100 may send a message to the host devices 201, 202, 203, . . . which has requested the memory resource allocation, the message indicating that the memory resource allocation is impossible, in operation S213.

FIG. 8 is a conceptual view for describing a memory resource utilization method in accordance with an embodiment of the present disclosure.

In order to allow memory resources to be shared in a data processing system 20-1, the network manager 100 may collect the usage states of the system memories 211, 212, 213, . . . and the memory pools of the data processing devices 300-1, 300-2, 300-3, . . . .

FIG. 8 shows that a part of the memory pool 333-1 of the first data processing device 300-1 is used as a computing memory, and the other part of the memory pool 333-1 of the first data processing device 300-1 is allocated as an external system memory of the first host device 201.

Furthermore, FIG. 8 shows that a part of the memory pool 333-2 included in the second data processing device 300-2 is used as the computing memory, and another part of the memory pool 333-2 is allocated as an external system memory of the third host device 203.

Furthermore, FIG. 8 shows that the entire memory pool 333-3 included in the third data processing device 300-3 is used as the computing memory.

Furthermore, FIG. 8 shows that a part of the system memory 212 included in the second host device 202 is allocated as an external system memory of the first host device 201.

Among the memory pools included in the plurality of data storage devices 300-1, 300-2, 300-3, . . . which process computations offloaded by the host devices 201, 202, 203, . . . , the free memory resources may be utilized as the external system memories of the host devices 201, 202, 203, . . . , which makes it possible to improve the processing speed of the data processing system 10 or 20.

Furthermore, the plurality of host devices 201, 202, 203, . . . may share free memory resources of the system memories 211, 212, 213, . . . , which makes it possible to further improve the performance of the data processing system 10 or 20.

While various embodiments have been described above, it will be understood to those skilled in the art that the embodiments described are examples only. Accordingly, the data processing system and the operating method thereof, which are described herein, should not be limited based on the described embodiments and the following claims. Furthermore, the embodiments may be combined to form additional embodiments.

What is claimed is:

1. A data processing system comprising:
   a plurality of data processing devices, each of the data processing devices including a computing memory and each of the data processing devices configured to perform one or more tasks which are offloaded from plural host devices;
   the plural host devices connected to the plurality of data processing devices, and each of the plural host devices configured to:
      select one or more of the data processing devices on the basis of meta information including a) a size of a memory, which is required for a first task to be performed, and b) sizes of respective computing memories of the respective data processing devices, and
      request the selected one or more data processing devices to perform the first task;
   a network switch configured to connect the plural host devices to the plurality of data processing devices; and
   a network manager included in the network switch and the network manager configured to:
      collect information on a) usage states of free memories of the respective data processing devices on the basis of the meta information and b) the sizes of the respective computing memories of the respective data processing devices, and
      control the plural host devices to use at least some of the free memories,
   wherein the plural host devices comprise respective free system memories, and
   wherein the network manager is further configured to:
      collect a usage state of a free system memory from each of the plural host devices, and
      allow at least a part of the free system memory of at least one of the plural host devices to be shared by other host devices of the plural host devices.

2. The data processing system according to claim 1, wherein the network manager is further configured to provide the one or more host devices with at least some of the free memories as system memories of the one or more host devices when the one or more host devices request memories for allocation.

3. The data processing system according to claim 2, wherein the network manager is further configured to distribute, to two or more of the host devices, the free memories according to ratios of the memories requested for allocation respectively by the two or more host devices when a total of the memories requested for allocation by the two or more host devices is larger than the size of the free memories.

4. The data processing system according to claim 2, wherein each of two or more of the host devices operates with a required target speed for a service to be provided, and
   wherein the network manager is further configured to allocate, to the two or more host devices, the free memories in proportion to the target speed for each of the two or more host devices when a total of the memories requested for allocation by the two or more host devices is larger than the size of the free memories.

5. The data processing system according to claim 1, wherein the network manager is further configured to:
   select the free memories from one or more of the data processing devices when a selected one of the host devices requests memory allocation, and
   provide the selected host device with the selected free memories.

6. The data processing system according to claim 1, wherein the network manager is further configured to provide at least some of the free memories and the free system memories to the one or more host devices when the one or more host devices request memory allocation.

7. An operating method of a data processing system in which a plurality of data processing devices, each of the plurality of data processing devices having a computing memory, are connected to plural host devices through a network manager, the operating method comprising:
- selecting, by each of the plural host devices, one or more of the plurality of data processing devices on the basis of meta information including a) a size of a memory, which is required for a first task to be performed, and b) sizes of respective computing memories of the respective data processing devices;
- requesting, by each of the plural host devices, the selected one or more data processing devices to perform the first task;
- collecting, by the network manager, information on a) usage states of free memories of the respective data processing devices on the basis of the meta information and b) the sizes of the respective computing memories of the respective data processing devices; and
- controlling, by the network manager, the plural host devices to use at least some of the free memories,
- wherein the plural host devices comprise respective free system memories, and
- wherein the operating method further comprises:
  - collecting, by the network manager, a usage state of a free system memory from each of the plural host devices, and
  - allowing, by the network manager, at least a part of the free system memory of at least one of the plural host devices to be shared by other host devices.

8. The operating method according to claim 7, further comprising providing, by the network manager, the one or more host devices with at least some of the free memories as system memories of the one or more host devices when the one or more host devices request memories for allocation.

9. The operating method according to claim 8, further comprising distributing to two or more of the host devices, by the network manager, the free memories according to ratios of the memories requested for allocation respectively by two or more of the host devices when a total of the memories requested for allocation by the two or more host devices is larger than the size of the free memories.

10. The operating method according to claim 8,
wherein each of two or more of the host devices operates with a required target speed for a service to be provided,
further comprising allocating to the two or more host devices, by the network manager, the free memories in proportion to the target speed for each of the two or more host devices when a total of the memories requested for allocation by the two or more host devices is larger than the size of the free memories.

11. The operating method according to claim 7, further comprising:
- selecting, by the network manager, the free memories from one or more of the data processing devices when a selected host device of the host devices requests memory allocation; and
- providing the selected host device with the selected free memories.

12. The operating method according to claim 7, further comprising providing, by the network manager, at least some of the free memories and the free system memories to the one or more host devices when the one or more host devices request memory allocation.

* * * * *